United States Patent
Reineke et al.

(10) Patent No.: US 11,340,817 B2
(45) Date of Patent: May 24, 2022

(54) DATA MANAGEMENT IN MULTI-CLOUD COMPUTING ENVIRONMENT

(71) Applicant: EMC IP Holding Company LLC, Hopkinton, MA (US)

(72) Inventors: Nicole Reineke, Northborough, MA (US); James R. King, Norwood, MA (US); Justin A. Kenney, Upton, MA (US); Robert A. Lincourt, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 124 days.

(21) Appl. No.: 16/507,578

(22) Filed: Jul. 10, 2019

(65) Prior Publication Data
US 2021/0011648 A1 Jan. 14, 2021

(51) Int. Cl.
*G06F 3/06* (2006.01)
*G06F 9/50* (2006.01)

(52) U.S. Cl.
CPC ............ *G06F 3/0647* (2013.01); *G06F 3/067* (2013.01); *G06F 3/0626* (2013.01); *G06F 3/0641* (2013.01); *G06F 9/5072* (2013.01)

(58) Field of Classification Search
CPC .... G06F 3/0647; G06F 9/5072; G06F 3/0626; G06F 3/067; G06F 3/0641
See application file for complete search history.

(56) References Cited

U.S. PATENT DOCUMENTS

| | | | |
|---|---|---|---|
| 9,558,288 B1 | 1/2017 | Boswell et al. | |
| 9,785,510 B1 | 10/2017 | Madhavarapu et al. | |
| 10,129,566 B2 | 11/2018 | Sadhwani et al. | |
| 2016/0192178 A1* | 6/2016 | Blong | G06F 3/067 455/418 |
| 2017/0111328 A1 | 4/2017 | Leon | |
| 2017/0177266 A1* | 6/2017 | Doerner | G06F 16/1752 |
| 2019/0155512 A1* | 5/2019 | Tenner | G06F 12/00 |
| 2020/0092392 A1* | 3/2020 | Seelam | G06F 12/084 |
| 2020/0201788 A1* | 6/2020 | Bissey | H04L 9/0643 |

OTHER PUBLICATIONS

U.S. Appl. No. 15/386,935 filed in the name of Junping Zhao et al., filed Dec. 21, 2016 and entitled "Compression and Encryption Aware Optimized Data Moving Across a Network."

\* cited by examiner

*Primary Examiner* — Masud K Khan
(74) *Attorney, Agent, or Firm* — Ryan, Mason & Lewis, LLP

(57) ABSTRACT

A data transfer request is received from an application program hosted at a first location in a computing environment for transferring a given data set to a second location in the computing environment. The data transfer request comprises information identifying one or more data types of the given data set and one or more preferences associated with the transfer of the given data set. The second location is notified of the data transfer request. The method causes deployment of one or more data-aware services to optimize the given data set prior to transfer to the second location, wherein optimizing the given data set is performed based on the one or more data types of the given data set and the one or more preferences associated with the transfer of the given data set. For example, the data-aware services at the first location may comprise data deduplication and/or data compression.

20 Claims, 4 Drawing Sheets

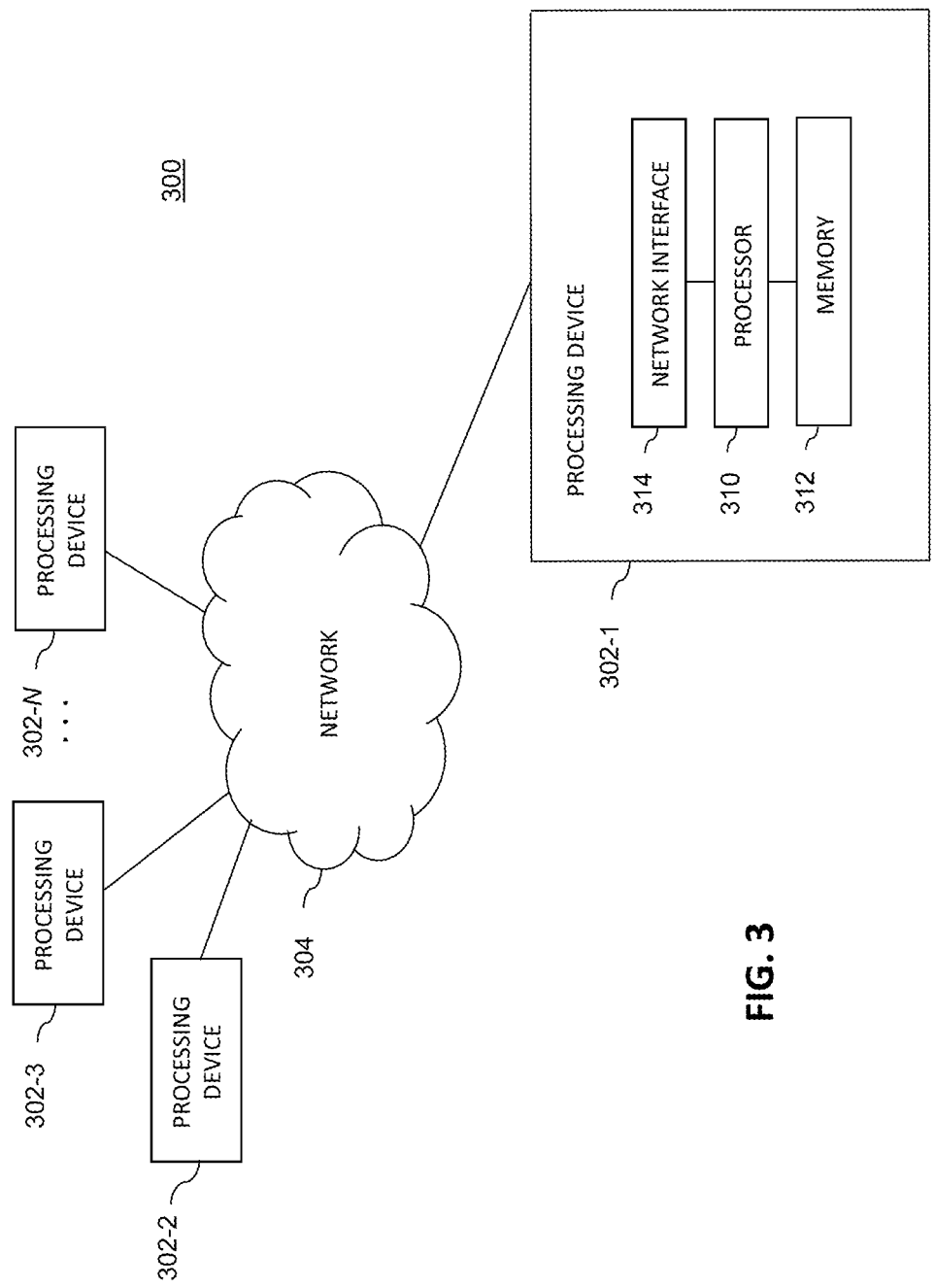

DATA MANAGEMENT IN MULTI-CLOUD COMPUTING ENVIRONMENT

FIELD

The field relates generally to multi-cloud computing environments, and more particularly to data management in such multi-cloud computing environments.

BACKGROUND

Computing environments frequently employ cloud computing platforms, where "cloud" refers to a collective computing infrastructure that implements a cloud computing paradigm. For example, cloud computing is a model for enabling ubiquitous, convenient, on-demand network access to a shared pool of configurable computing resources (e.g., compute, memory, storage) that can be rapidly provisioned and released with minimal management effort or service provider interaction.

Enterprises such as corporations typically utilize a cloud computing environment to manage their applications, services and data. One or more cloud platforms that are part of this environment may be within the exclusive control and management of the enterprise, and therefore are considered "private clouds." On the other hand, the cloud computing environment can include one or more cloud platforms that can be used by multiple enterprises (tenants or customers), and that are not necessarily controlled or managed by any of the multiple enterprises but rather are controlled and managed by one or more third-party cloud providers. Such cloud platforms are typically considered "public clouds." More typically, enterprises may choose to host their applications, services and data on a combination of multiple clouds that form a "multi-cloud computing environment." A multi-cloud computing environment that includes one or more public clouds and one or more private clouds is sometimes referred to as a "hybrid cloud computing environment." Note also that one or more cloud platforms can form what is known as a "data center." Thus, in some scenarios, a multi-cloud computing environment can include multiple data centers.

For example, in one multi-cloud computing scenario, applications of tenants (user or customer of a given cloud platform) are typically run on one or more computing devices (i.e., host devices or hosts), and write data to and read data from one or more storage devices (e.g., hard disk drives, flash drives, etc.). The storage devices may be remote from the host devices (part of so-called "remote storage") and storage devices may be local to the host (part of so-called "primary storage"), e.g., part of the same computing device(s) that implement the host. In a data tiering hierarchy, the primary storage is typically considered a first storage tier and the remote storage is typically considered a second storage tier. Also, it is to be understood that an enterprise can implement a primary storage tier internal to the enterprise, and utilize cloud storage (external to the enterprise) through one or more public cloud platforms when needed. This would be one example of a hybrid cloud computing environment. Examples of public cloud platforms include, but are not limited to, Amazon Web Services® (AWS), Google Compute Engine® (GCE), and Windows Azure® platforms.

However, managing data that is stored and then moved between two or more locations in a multi-cloud computing environment presents some significant challenges.

SUMMARY

Embodiments of the invention provide techniques for improved data management in a multi-cloud computing environment.

For example, in one embodiment, a method comprises the following steps. A data transfer request is received from an application program hosted at a first location in a computing environment for transferring a given data set to a second location in the computing environment. The data transfer request comprises information identifying one or more data types of the given data set and one or more preferences associated with the transfer of the given data set. The second location is notified of the data transfer request. The method causes deployment of one or more data-aware services to optimize the given data set prior to transfer to the second location, wherein optimizing the given data set is performed based on the one or more data types of the given data set and the one or more preferences associated with the transfer of the given data set. For example, the data-aware services at the first location may comprise data deduplication and/or data compression.

In another embodiment, a method comprises the following steps. A data transfer request is received from a first location in a computing environment for transferring a given data set to a second location in the computing environment, wherein the data transfer request comprises information identifying one or more data types of the given data set and one or more preferences associated with the transfer of the given data set. The method causes deployment of one or more data-aware services to process the given data set, wherein processing the given data set is performed based on the one or more data types of the given data set and the one or more preferences associated with the transfer of the given data set. For example, the data-aware services at the second location may comprise data hydration/rehydration.

Advantageously, illustrative embodiments provide for techniques that reduce overall network egress via source (first) location deduplication and compression running on compute nodes that is significantly less expensive than network egress. The receiving (second) location gets subsets of data which reduces overall transfer requirements.

These and other features and advantages of the invention will become more readily apparent from the accompanying drawings and the following detailed description.

BRIEF DESCRIPTION OF THE DRAWINGS

FIG. 3 illustrates a processing platform used to implement an architecture for improved data management in a multi-cloud computing environment, according to an embodiment of the invention.

DETAILED DESCRIPTION

Figure 1:
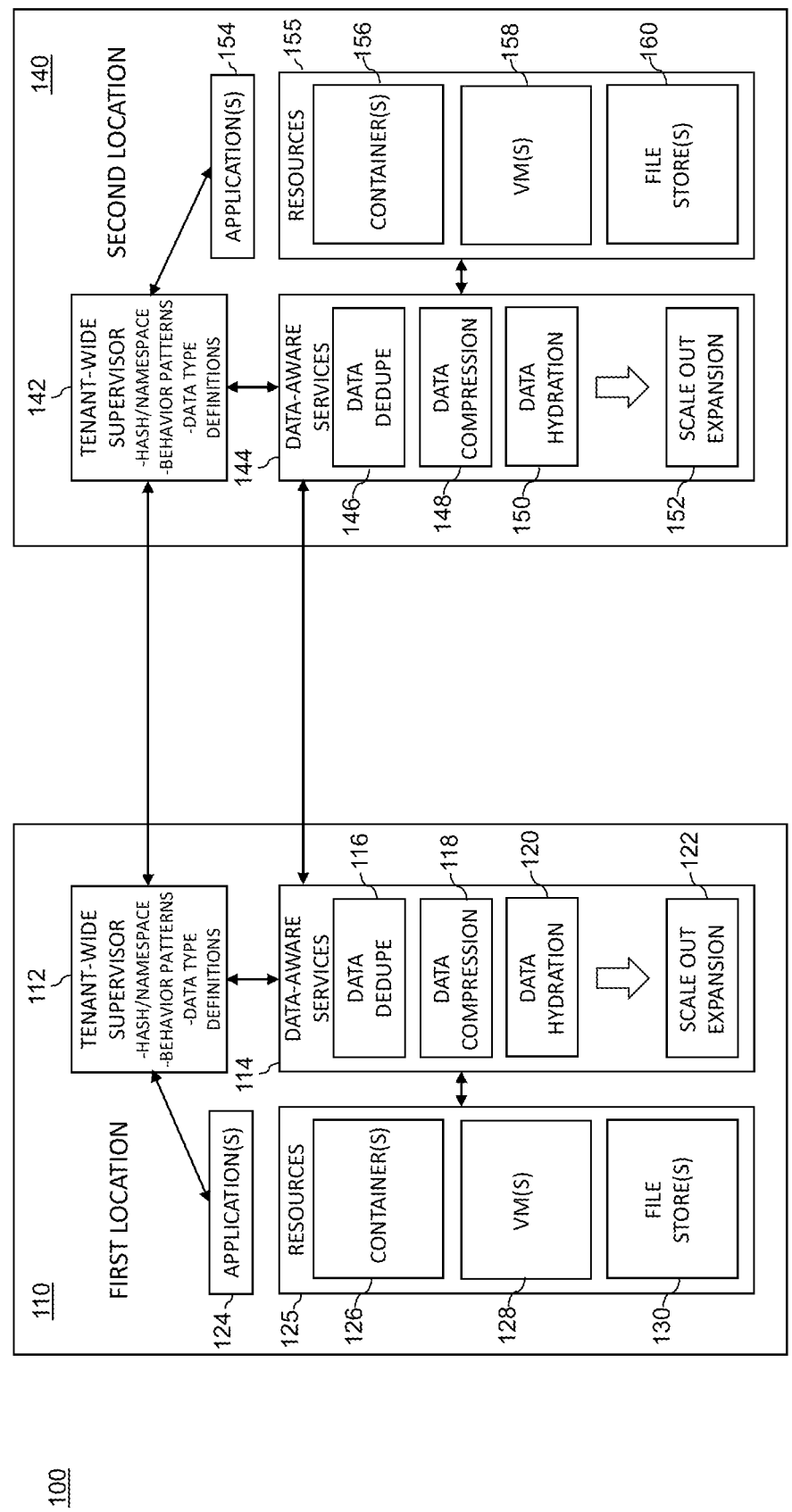
FIG. 1 is a block diagram of an architecture for improved data management in a multi-cloud computing environment, according to an embodiment of the invention.

Illustrative embodiments may be described herein with reference to exemplary cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

In some embodiments, the multi-cloud computing environment can also include one or more edge computing networks. Edge computing is a decentralized data processing paradigm which effectively moves applications, data and computing services away from a centralized point to locations closer to the end users. While edge computing networks can operate separate from any cloud platform, in some embodiments, such edge computing networks, or at least one or more components of an edge computing network, interact with one or more cloud platforms and thus are part of the improved data management techniques described herein.

Within the context of a multi-cloud computing environment, it is realized that the use of data services, such as, for example, data deduplication, data compression and/or data hydration, has many advantages. In general, such data services provide some form of data optimization or operation that benefits the computing environment within which they are performed, e.g., reducing processing overhead and network congestion, improving processing and storage speed, satisfying service level agreements between tenants and service providers, etc.

Data deduplication (or dedupe as it is known in short) is a data service that segments an incoming data stream, uniquely identifies data segments, and then compares the segments to previously stored data. If the segment is unique, it is stored on disk. However, if an incoming data segment is a duplicate of what has already been stored, a reference is created to it and the segment is not stored again. For example, a file or volume that is backed up every week creates a significant amount of duplicate data. A data deduplication service analyzes the data and stores only the unique segments of a file. This process can provide an average of 10 to 30 times reduction in storage capacity requirements, with average backup retention policies on normal enterprise data. This means that companies can store 10 TB to 30 TB of backup data on 1 TB of physical disk capacity, which has huge economic benefits.

Data compression is a data service that is used to compress the unique segments of a file before they are stored on disk. Data compression in a block-based storage system reduces the size of data on disk, typically increasing available capacity up to about 50 percent. Compression can typically be enabled automatically and operates in the background to avoid performance degradation.

Data hydration is a data service that takes a data object that exists in memory that does not yet contain any domain data (i.e., real, disk-consuming data) and writes data into the original state of the data object. This is known as hydrating or rehydrating a data object.

Note that a data service that is performed on data before or as it is being written to a storage device may be referred to as an "inline" data service, e.g., inline data compression, inline data deduplication, etc.

Illustrative embodiments provide an architecture for improved data management in a multi-cloud computing environment that employs one of more data services. More particularly, as will be illustratively explained in detail herein, illustrative embodiments enable data-aware lossy or lossless data compression, tenant-wide deduplication, and optimized movement (e.g., copy, transfer, replication, secure file transfer protocol (sftp), etc.) of data from a cloud location to a secondary cloud location or data center where rehydration is optimized by data type and intent. In one or more illustrative embodiments, the data that is being managed includes so-called artificial intelligence/machine learning and analytics data (i.e., AI/ML, and analytics data types).

Such improved data management is achieved in one or more illustrative embodiments through tenant-wide supervisor modules (supervisors) and local services referred to herein as data-aware services (DAS). Such data-aware services reduce the amount of data sent and the amount of network consumed based on the end users' optimization preferences and data types (stored and controlled by the supervisor) which enable lossy or lossless data transfer and deduplication combined with a destination service which acts as a catcher and data-type aware rehydration enabling optimized write, placement and storage on the destination.

Supervisors hold the tenant-wide hash and full namespace definition for use in dedupe, along with behavior patterns and definitions for unique data types (e.g., log files can be transferred in lossy format without dedupe, whereas videos require loss-less compression and 216 bit block pattern dedupe). Behavior patterns here may include, but are not limited to, frequency of access, external access patterns (e.g., if there is a secondary source that references a type of data on a time/function basis), preference and transfer priority (e.g., critical versus non-critical, drip versus drop), training model relevance (e.g., normalization and aggregation of data to meet the heuristic needs of the data set in relation to the training model needs), data locality and placement.

Supervisors identify the required characteristics (e.g., compute, memory, and storage) of the DAS by analyzing the requesting transfer host characteristics and data types (e.g., virtual machine (VM), container, file store location and database, videos, images, log files, etc.), deploy one or more appropriately-sized transfer DASs with the required memory and compute to perform the data dedupe and compression required to move the identified transfer host data type. The DAS also performs validation on the remote location to ensure hash table quiescence with the local hash.

The destination location has a receiving supervisor which holds the full tenant hash, which will receive the transfer request. The receiving supervisor deploys one or more receiving DAS services with the required memory and compute and source data definition to perform the hydration in accordance with the defined data types and required user behavior.

Prior to data transfer, data is deduplicated and compressed in accordance with the data type and user intent using a hash that is tenant-wide and security-aware. User intent is monitored/interpreted with machine learning capability such that dynamic responses to access patterns are enabled. DAS can optimize both the level at which the data is deduplicated (this controls both the speed of the deduplication and the size of the transfer DAS (e.g., more compression and deduplication requires larger processing capabilities)) along with implied behaviors for the data type (e.g., lossy or lossless compression).

The optimized data is then transferred to the receiving DAS. Validation occurs on data, and data can be present if required. For example, in some embodiments, hash/namespace validation can be done with techniques as simple as basic backup hash comparison capabilities, but can be more complex such as Merkle comparisons as utilized in blockchain. Validation of data is configurable and, in some embodiments, can be row-to-row, block level or entire databases.

The destination location behaviors can include 1:1 hydration for immediate data utilization in the form it was sent, data-aware hydration (rehydration of lossy-data or data spreading across different infrastructure definitions with known potential metadata loss) or may be stored in compressed/deduplicated format for future rehydration.

A secondary benefit to this architecture according to illustrative embodiments is the scale-out implementation is able to utilize resources external to the workload running in the primary cloud location to perform the data deduplication and compression, ensuring that quality of service (QoS) of the primary application is not impacted. Thus, the data-aware services can be run on resources internal to the primary cloud location, external to the primary cloud location, or some combination thereof.

Before describing illustrative architectures and methodologies for implementing the above-mentioned inventive features, some main problems with existing data management in multi-cloud computing environments will be described.

Data transfer from a hosted cloud location is expensive. More specifically, large data set movement is expensive. Reducing the network utilization by reducing the data transferred enables dramatic cost savings for large data sets. Compute, memory and transient local workloads are relatively inexpensive. A goal realized in accordance with illustrative embodiments is to use the less expensive resources to dramatically reduce expensive network egress charges.

AI/ML and analytics data is not all the same, and should not be treated as such. Current data transfer activities treat all data in a similar fashion, i.e., applying a single deduplication algorithm or type of compression to all selected data. In accordance with illustrative embodiments, it is realized that data optimization for different types of data should be tailored to the data type, taking into account probable performance of the data deduplication and ability to support different compression technologies. It is further realized that data optimization should also be aligned with the end users' intent for the data copy. Illustrative embodiments provide for such alignment.

Delayed access to critical data based on required transfer priority can delay critical research or tasks. Some data set types are of a nature that partial data transfer will provide value to the end user. Illustrative embodiments enable the user to identify partial-transfer data sets which will prioritize data sending and hydration based on last access time, sending data that is last touched to the receiving DAS and enabling fast data access. In some embodiments, such partial data set identification is performed in the supervisor.

Edge native AI/ML and analytics jobs are compute/storage-constrained. Moving AWL training activities into edge computing components is hindered by the limited compute/storage capacity that exists within edge computing environments. Typically, model training consists of large datasets in dedicated environments. Model training in the context of edge models is typically reserved for dependent feature training and/or subsets of the larger data. There exists a need within this space or a data service type solution that can mathematically guarantee that a subset of the training data provides high value in training sub-model features. Model training, in some embodiments, is part of the source-side data-aware services. For example, the system receives the heuristics of the data, when requested to have the data for an action, and the source-side identifies the relevant data.

Illustrative embodiments overcome the above and other drawbacks with existing data management techniques by offerings existing data dedupe and compression operations as an on-demand tenant-wide data deduplication and compression transfer and receiver optimization service for cloud locations optimized for disparate data types commonly associated with AI/ML and analytics jobs.

Services scale up with on-demand service deployment based on adjustable levels of deduplication at the byte level (e.g., 8, 12, 255, 512, etc.) and compression level (lossy and loss-less), and enable deduplication across all tenant-owned locations through a supervisor running in the cloud.

Receiving locations scale up through on-demand service deployment and are able to store data in the deduped and compressed format, available for rehydration at a later date, or rehydrate and place data fully-formed, or rehydrate in new data-type optimized format. A receiving location need only run a small proxy service that can be deployed into any compute environment. This reduces the need for larger infrastructure environments such as local datacenters or cloud hosting options.

Illustrative embodiments reduce overall network egress via source location dedupe and compression running on cloud-based compute nodes that is significantly less expensive than network egress. The receiving location gets subsets of data which reduces overall transfer requirements.

If the priority is to consume the least amount of network transfer consumption, and local memory for deploying transfer DAS is inexpensive, the priority of the application should reflect utilizing the maximum local resources to achieve maximum deduplication and compression. If the priority is fast transfer with some network consumption reduction, a larger byte-level comparison will be instantiated by the transfer supervisor. If the priority is to move non-critical log files at the lowest cost possible, simple lossy-compression should be applied. If the intent is to move massive image or database stores with no interest in maintaining the current underlying infrastructure, the data can be sent and rehydrated without limitations on duplicating the source structure or disk consumption.

Creating a priority-based concept along with the rehydration capability, in accordance with illustrative embodiments, facilitates policy-based transfer. This transfer policy is made aware of the data type to infer the ordering in which data rehydration should occur. Combining this policy with metadata on the dataset mimics a "hot-data" concept within a larger dataset than traditional caching technologies leverage.

Illustrative embodiments also associate independent metadata on the source side that annotates additional attributes of rehydrated data. These attributes provide information required by applications on the receiving location so that they can achieve confidence in the results of calculations done on partially rehydrated data. Annotation, in some embodiments, is part of the source-side data-aware services, e.g., the system receives the heuristics of the data, when requested to have the data for an action, and the source-side identifies the relevant data.

Turning now to FIG. 1, an architecture 100 is depicted for improved data management that implements the above-mentioned features and advantages, according to an embodiment of the invention.

As shown, a first location 110 is operatively coupled to a second location 140. As mentioned above, each of location 110 and 140 can be a cloud platform (private and/or public), data center or edge computing network. Collectively, location 110 and 140 comprise a multi-cloud computing environment. While only two locations are shown in FIG. 1, it is to be appreciated that more than two locations can be involved in the improved data management architecture 100. For example, in some embodiments, data at a first location can be optimized and transferred to two or more other locations.

Each location is configured to have the following functionalities/components: a tenant-wide supervisor module (supervisor 112 at first location 110 and supervisor 142 at second location 140), a set of configurable data-aware services or DAS (DAS 114 comprises data dedupe 116, data compression 118, data hydration 120 and scale-out expansion service 122 at first location 110 and DAS 144 comprises data dedupe 146, data compression 148, data hydration 150 and scale-out expansion service 152 at second location 140), one or more applications (application(s) 124 at first location 110 and application(s) 154 at second location 140) and compute, memory and storage resources (resources 125 comprising container(s) 126, virtual machine(s) or VM(s) 128 and file store(s) 130 at first location 110 and resources 155 comprising container(s) 156, VM(s) 158 and file store(s) 160 at second location 140). Note that since the supervisor at each location in the architecture 100 can function both as a transferring supervisor and a receiving supervisor (depending on the direction of data transfer), each location is configured to provide appropriate data-aware services as needed. Note that each location may have other resources/functionalities/components than those illustrated in FIG. 1.

Figure 2A:
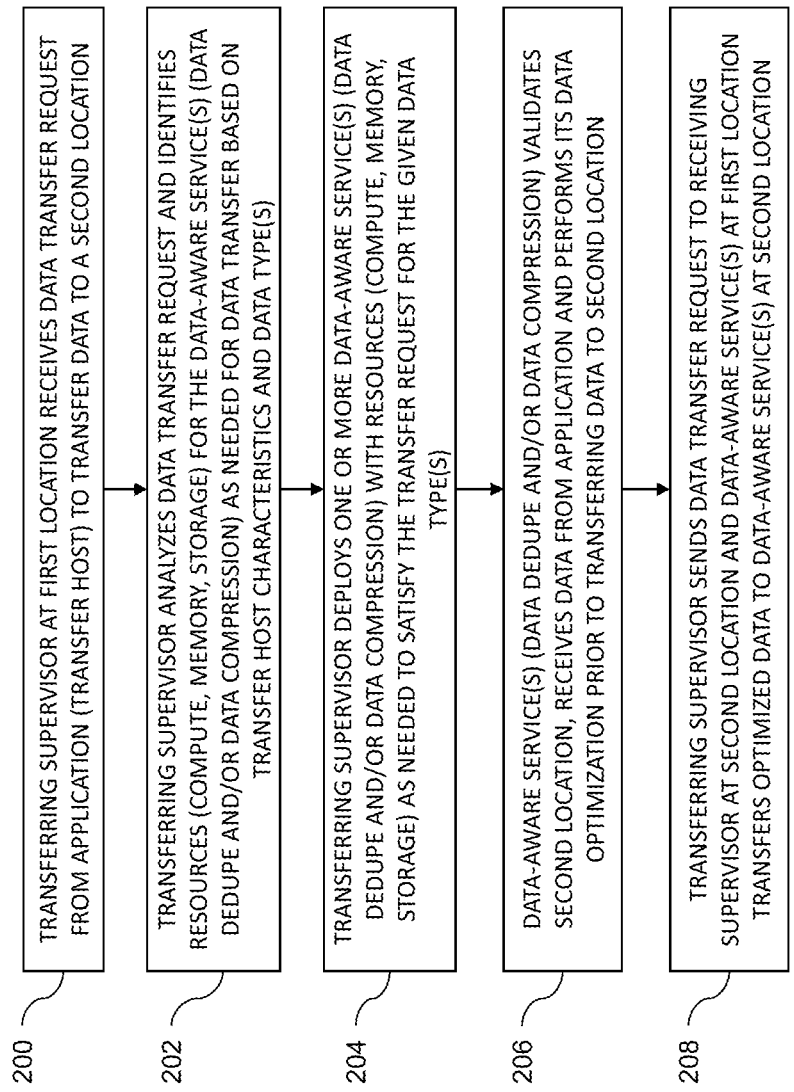
FIGS. 2A and 2B are flow diagrams of an improved data management methodology in a multi-cloud computing environment, according to an embodiment of the invention.
Figure 2B:
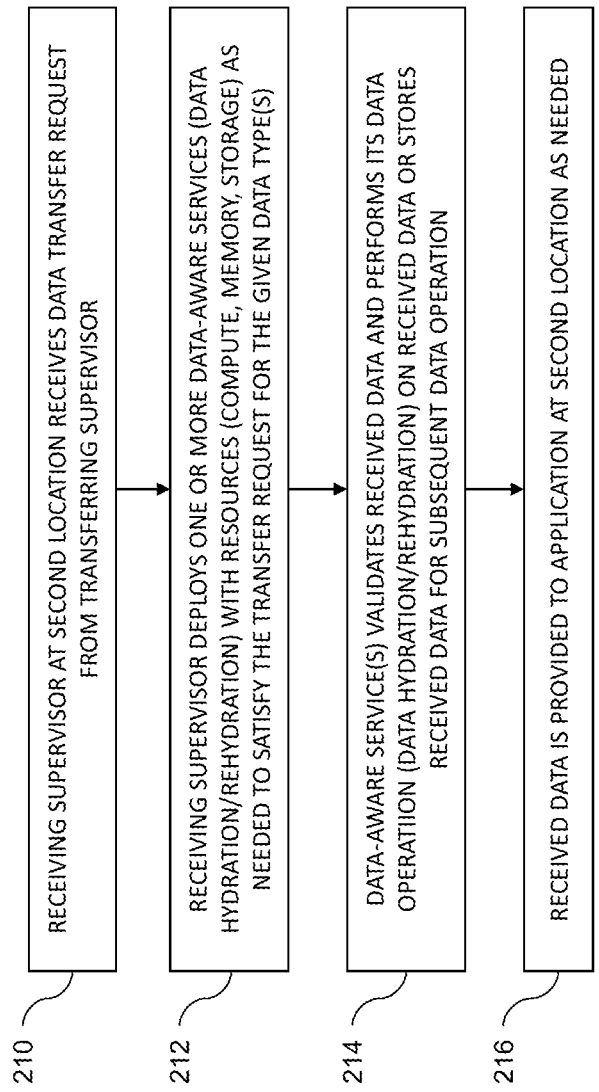

FIGS. 2A and 2B depict an improved data management methodology in the architecture 100 if FIG. 1. Assume in this illustrative description that first location 110 is transferring data to second location 140.

As shown in FIG. 2A, at step 200, transferring supervisor 112 at first location 110 receives a data transfer request from application 124 to transfer data to second location 140. In one or more embodiments, the transfer request includes information including user intent and data types with respect to the data to be transferred to the second location.

At step 202, transferring supervisor 112 analyzes the data transfer request and identifies resources 125 (compute, memory, storage resources, e.g., part of one or more of container(s) 126, VM(s) 128 and file store(s) 130) for data-aware service(s) 114 (in transferring case, data dedupe 116 and/or data compression 118) as needed for data transfer based on transfer host characteristics and data type(s). Some examples of transfer host characteristics include, but are not limited to, location (e.g., AWS, Azure, private-hosted), network connectivity, data type information (database versus image) inclusive of metadata generated from the data.

At step 204, transferring supervisor 112 deploys one of more of data dedupe 116 and data compression 118 with the resources identified in step 202 for the given data type(s) of the data to be transferred. Note that if sufficient DAS/resources are already deployed for the given transfer request, the supervisor 112 need not deploy additional DAS/resources.

At step 206, data dedupe 116 and/or data compression 118 validates the second location, receives the data to be transferred from the application 124 and performs its data optimization (deduplication for data dedupe service 116 and compression for data compression service 118) prior to transferring the data to second location 140. Note that depending on the data type of the data to be transferred and/or user intent, different levels and/or types of dedupe and compression are performed. In some embodiments, source-side DAS can validate the destination by identification of adequate resources, matching container/resource platforms/network connectivity, and data gravity (location of destination compared to source).

At step 208, transferring supervisor 112 sends a data transfer request to receiving supervisor 142 at second location 140. Note that the data transfer request can alternatively be sent from transferring supervisor 112 to receiving supervisor 142 earlier in the process. Also, data dedupe 116 and/or data compression 118 transfer the optimized data (deduped and/or compressed) to second location 140.

As shown in FIG. 2B, at step 210, receiving supervisor 142 receives the data transfer request from transferring supervisor 112.

At step 212, receiving supervisor 142 deploys one or more data-aware services 144 (in receiving case, data hydration 150) with resources 155 (compute, memory, storage resources, e.g., part of one or more of container(s) 156, VM(s) 158 and file store(s) 160) as needed to satisfy the transfer request for the given data type(s) of the data being received.

At step 214, upon receipt, data hydration 150 validates the received data (e.g., hash and validation types if dependent on data types and security needs) and then performs its data operation (hydration or rehydration) on the received data or stores the received data for a subsequent data operation (e.g., hydration or rehydration at a later time).

At step 216, the received data is provided to application 154 as needed.

The particular processing operations and other system functionality described in conjunction with FIGS. 1, 2A and 2B are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

The following are some non-limiting illustrative use cases with which the above-described data management architecture and methodologies can be applied in some embodiments.

Use case 1: AI group wants to utilize university-stored database (DB) with log files in a public cloud location located on the east coast of U.S. for analysis at a west coast data center, and needs to copy them to their local laboratory. In this use case, there are different data types. Assume that the DB is deduped while log files are compressed lossy, video files happen to have been previously transferred by another department so only pointers are sent, and data grabbed on destination location. Data is rehydrated with intent to run on different size (original DB was across 10 compute nodes, new DB is 1 compute node), while some data is stored for future use and not rehydrated. A secondary grab for a data set would be hyper-optimized. The term "hyper-optimized" as illustratively used herein means to optimize at a granular level, e.g., block level versus file level. This is unique to the data set and time of the data request, e.g., in some instances, groups of blocks may be needed, while in other instances, the need may be 8 bits versus 256 bits.

Use case 2: FTP (file transfer protocol) data sets are transferred to hosted private cloud from local data center. This is a common enterprise use case wherein databases and log files are uploaded nightly for analysis/support.

Use case 3: data tiering. Assume an enterprise is renting space at an edge computing network from a given edge service provider. Data at the edge computing network can grow quickly. Based on last access patterns, the enterprise could determine that moving a subset of data to cheaper hosted storage makes good business sense. Data management according to illustrative embodiments is used to reduce costs of data movement. Hosting long term/cold data in the cloud could present an opportunity to take advantage of future cheap and deep storage platforms, and reduce egress cost.

Use case 4: data copy/data gravity. Assume a government operated laboratory owns data sets hosted in a given cloud that they rent out to government contractors for AI/ML/Analytics use cases. The egress charges outweigh the cost benefits for the data.

Use case 5: last access pattern on transfer and hydration. As an example, customers always need to balance the cost of infrastructure to meet a desired recovery point objective (RPO) and recovery time objective (RTO). The hot data could be prioritized and transferred to the disaster recovery (DR) site giving the customer the ability to recover the business faster than traditional data migration methods.

Use case 6: database colocation to edge computing network. Pointer-based database transfers that only move data to the edge environment when a table/row is queried. Allowing for subsets of significantly larger databases to be leveraged by constrained edge computing resources. Database services would be presented as a sub-hydration service that exposes a database native endpoint. This endpoint would transparently handle the migration and deduplication challenges associated with an edge environment.

Use case 7: data-sharing of large datasets (e.g., Human Genome). Assume that during a customer conversation, it is determined that they needed to share large datasets across geographic boundaries. These distances and the size of the data (PBs) limits this ability to share full copies economically. In accordance with illustrative embodiments, partial components of the data that are annotated with attributes of mathematical variance would sufficiently accomplish the need to enable cooperative research institutions. For example, the DAS (e.g., part of 122) may be configured to be more granular to than the supervisor, and is workload/pod aware and able to communicate with the supervisor.

FIG. 3 illustrates a processing platform used to implement an architecture for improved data management in a multi-cloud computing environment, according to an embodiment of the invention. More particularly, processing platform 300 is a processing platform on which a multi-cloud computing environment with improved data management functionalities (e.g., FIGS. 1, 2A and 2B and otherwise described herein) can be implemented.

The processing platform 300 in this embodiment comprises a plurality of processing devices, denoted 302-1, 302-2, 302-3, . . . 302-N, which communicate with one another over a network 304. It is to be appreciated that the methodologies described herein may be executed in one such processing device 302, or executed in a distributed manner across two or more such processing devices 302. It is to be further appreciated that a server, a client device, a computing device or any other processing platform element may be viewed as an example of what is more generally referred to herein as a "processing device." As illustrated in FIG. 3, such a device generally comprises at least one processor and an associated memory, and implements one or more functional modules for instantiating and/or controlling features of systems and methodologies described herein. Multiple elements or modules may be implemented by a single processing device in a given embodiment.

The processing device 302-1 in the processing platform 300 comprises a processor 310 coupled to a memory 312. The processor 310 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 310. Memory 312 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 312 may comprise electronic memory such as random-access memory (RAM), read-only memory (ROM) or other types of memory, in any combination. The one or more software programs when executed by a processing device such as the processing device 302-1 causes the device to perform functions associated with one or more of the components/steps of system/methodologies in FIGS. 1, 2A and 2B. One skilled in the art would be readily able to implement such software given the teachings provided herein. Other examples of processor-readable storage media embodying embodiments of the invention may include, for example, optical or magnetic disks.

Processing device 302-1 also includes network interface circuitry 314, which is used to interface the device with the network 304 and other system components. Such circuitry may comprise conventional transceivers of a type well known in the art.

The other processing devices 302 (302-2, 302-3, . . . 302-N) of the processing platform 300 are assumed to be configured in a manner similar to that shown for computing device 302-1 in the figure.

The processing platform 300 shown in FIG. 3 may comprise additional known components such as batch processing systems, parallel processing systems, physical machines, virtual machines, virtual switches, storage volumes, etc. Again, the particular processing platform shown in this figure is presented by way of example only, and the system shown as 300 in FIG. 3 may include additional or alternative processing platforms, as well as numerous distinct processing platforms in any combination.

Also, numerous other arrangements of servers, clients, computers, storage devices or other components are possible in processing platform 300. Such components can communicate with other elements of the processing platform 300 over any type of network, such as a wide area network (WAN), a local area network (LAN), a satellite network, a telephone or cable network, or various portions or combinations of these and other types of networks.

Furthermore, it is to be appreciated that the processing platform 300 of FIG. 3 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 300 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the sensor data valuation and management system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
receiving a data transfer request from an application program hosted at a first location in a computing environment for transferring a given data set to a second location in the computing environment, wherein the data transfer request comprises information identifying one or more data types of the given data set and one or more preferences associated with the transfer of the given data set;
notifying the second location of the data transfer request;
determining, based at least in part on the information identifying the one or more data types of the given data set and the one or more preferences associated with the transfer of the given data set, resource characteristic requirements for one or more data-aware services to be utilized for optimizing the given data set prior to transfer to the second location;
causing deployment of one or more data-aware services with the determined resource characteristic requirements to optimize the given data set prior to transfer to the second location, wherein optimizing the given data set is performed based on the one or more data types of the given data set and the one or more preferences associated with the transfer of the given data set, wherein the one or more data-aware services comprise one or more of a data deduplication service and a data compression service; and
validating, with the one or more data-aware services, the second location prior to transferring the given data set thereto;
wherein the steps are performed via one or more processing devices.

2. The method of claim 1, wherein the step of causing deployment of the one or more data-aware services further comprises utilizing resources of the first location.

3. The method of claim 1, wherein the step of causing deployment of the one or more data-aware services further comprises utilizing resources external to the first location.

4. The method of claim 1, further comprising causing execution of the one or more data-aware services on the given data set.

5. The method of claim 4, wherein the one or more data-aware services are executed on a portion of the given data set.

6. The method of claim 1, further comprising transferring the given data set to the second location after execution of the one or more data-aware services on the given data set.

7. The method of claim 1, wherein the one or more data types of the given data set are artificial intelligence/machine learning and analytics data types.

8. The method of claim 1, wherein one or more of the first location and second location is a cloud computing platform.

9. The method of claim 1, wherein one or more of the first location and second location is an edge computing network.

10. An article of manufacture comprising a processor-readable storage medium having encoded therein executable code of one or more software programs, wherein the one or more software programs when executed by the one or more processing devices implement the steps of claim 1.

11. A system, comprising:
at least one processor, coupled to a memory, and configured to:
receive a data transfer request from an application program hosted at a first location in a computing environment for transferring a given data set to a second location in the computing environment, wherein the data transfer request comprises information identifying one or more data types of the given data set and one or more preferences associated with the transfer of the given data set;
notify the second location of the data transfer request;
determine, based at least in part on the information identifying the one or more data types of the given data set and the one or more preferences associated with the transfer of the given data set, resource characteristic requirements for one or more data-aware services to be utilized for optimizing the given data set prior to transfer to the second location;

cause deployment of one or more data-aware services with the determined resource characteristic requirements to optimize the given data set prior to transfer to the second location, wherein optimizing the given data set is performed based on the one or more data types of the given data set and the one or more preferences associated with the transfer of the given data set, wherein the one or more data-aware services comprise one or more of a data deduplication service and a data compression service; and validate, with the one or more data-aware services, the second location prior to transferring the given data set thereto.

12. The system of claim 11, wherein the at least one processor is further configured to:

cause deployment of the one or more data-aware services further comprises utilizing resources of the first location.

13. The system of claim 11, wherein the at least one processor is further configured to:

cause deployment of the one or more data-aware services further comprises utilizing resources external to the first location.

14. The system of claim 11, wherein the at least one processor is further configured to:

cause execution of the one or more data-aware services on at least a portion of the given data set; and transfer the given data set to the second location after execution of the one or more data-aware services on the given data set.

15. A method, comprising:

receiving a data transfer request from a first location in a computing environment for transferring a given data set to a second location in the computing environment, wherein the data transfer request comprises information identifying one or more data types of the given data set and one or more preferences associated with the transfer of the given data set;

determining, based at least in part on the information identifying the one or more data types of the given data set and the one or more preferences associated with the transfer of the given data set, resource characteristic requirements for one or more data-aware services to be utilized for optimizing the given data set prior to transfer to the second location;

causing deployment of one or more data-aware services with the determined resource characteristic requirements to process the given data set, wherein processing the given data set is performed based on the one or more data types of the given data set and the one or more preferences associated with the transfer of the given data set, wherein the one or more data-aware services comprises a data hydration service; and validating, with the one or more data-aware services, the given data set;

wherein the steps are performed via one or more processing devices.

16. The method of claim 15, wherein the processing of the given data set by the one or more data-aware services is performed at a time subsequent to receipt of the given data set at the second location.

17. The method of claim 15, wherein the one or more data types of the given data set are artificial intelligence/machine learning and analytics data types.

18. The method of claim 15, wherein one or more of the first location and second location is a cloud computing platform.

19. The method of claim 15, wherein one or more of the first location and second location is an edge computing network.

20. An article of manufacture comprising a processor-readable storage medium having encoded therein executable code of one or more software programs, wherein the one or more software programs when executed by the one or more processing devices implement the steps of claim 15.

* * * * *